US 9,100,282 B1
Aug. 4, 2015

(12) United States Patent
Raps et al.

(54) GENERATING OPTIMAL PATHWAYS IN SOFTWARE-DEFINED NETWORKING (SDN)

(71) Applicants: Yaron Raps, New York, NY (US); Lov Kher, Monmouth Junction, NJ (US); Nitin Sharma, New York, NY (US)

(72) Inventors: Yaron Raps, New York, NY (US); Lov Kher, Monmouth Junction, NJ (US); Nitin Sharma, New York, NY (US)

(*) Notice: Subject to any disclaimer, the term of this patent is extended or adjusted under 35 U.S.C. 154(b) by 0 days.

(21) Appl. No.: 14/588,140

(22) Filed: Dec. 31, 2014

Related U.S. Application Data (60) Provisional application No. 61/932,733, filed on Jan. 28, 2014.

(51) Int. Cl.
H04L 12/751 (2013.01)
H04L 12/721 (2013.01)

(52) U.S. Cl.
CPC .............. H04L 45/02 (2013.01); H04L 45/123 (2013.01)

(58) Field of Classification Search
CPC .... H04L 41/0213; H04L 45/02; H04L 45/123
USPC ........................................... 370/254
See application file for complete search history.

(56) References Cited

U.S. PATENT DOCUMENTS

2010/0281388 A1* 11/2010 Kane et al. ............ 715/736
2014/0075519 A1* 3/2014 Porras et al. ............ 726/4

OTHER PUBLICATIONS

Jonathan Hurd, "Bandwidth: How much is enough?", Jun. 2008, pp. 1-2.*
Dish, "DISH Energizes Hopper Platform Giving Customers the Ability to Record Industry-Leading Eight Shows Simultaneously; Delivers WHole Hopper to Whole Home", Jan. 6, 2014, pp. 1-4.*

* cited by examiner

Primary Examiner — Jung Park
Assistant Examiner — Albert Shih
(74) Attorney, Agent, or Firm — Roy Rosser (57) ABSTRACT A method for optimizing delivery of digital information packets across a network of linked, packet switching nodes is disclosed. A suitably programmed computer translates business oriented requests into network technical requirements. The computer then uses knowledge including pre-stored or real-time discovered topographical maps of the network, and a database of the current attributes of the components of the network, to automatically determine settings for software addressable forwarding devices on the network to implement the network technical requirements, and then configures the network remotely via the software addressable switches at nodes on the network.

13 Claims, 6 Drawing Sheets

GENERATING OPTIMAL PATHWAYS IN SOFTWARE-DEFINED NETWORKING (SDN)

CLAIM OF PRIORITY

This application claims priority to U.S. Provisional Patent Application 61/932,733 filed on Jan. 28, 2014, the contents of which are fully incorporated herein by reference.

FIELD OF THE INVENTION

The invention relates to systems and methods for optimizing the pathways of digital packets in digital packet switching networks, and more particularly to a system and method for translating business requirements into technical requirements that may be implemented in a network from a central location via programmable software abstraction, thereby allowing control functions to manage the forwarding devices, i.e., switches.

BACKGROUND OF THE INVENTION

Packet switching communication networks typically operate via packet routers and/or packet switches located at the nodes of the network. The nodes typically have rules for how to deal with incoming packets based on the packets origination and destination addresses. Traditionally these rules have been implemented by network managers, each of which may only control a small portion of the total network. To make networks more manageable and easier to optimize, new forwarding devices have been introduced with support for separate control planes and data planes. These forwarding devices may be set remotely using software commands so that the network can be controlled in a more centralized way. Control of the network is however still a complex task requiring detailed technical knowledge. Many users, particularly business users, may have specific business goals concerning the transfer of data across the network but lack the technical background to implement those goals and have to rely on their technical support to achieve them.

The present invention addresses this problem with an inventive concept—a system that allows a business user having little or no technical knowledge, but a specific objective in mind, to interact directly with the network and achieve their objectives or the closest possible performance that the network can support.

DESCRIPTION OF THE RELATED ART

The relevant prior art wiring includes:

U.S. Pat. No. 8,335,678 issued to Hughes, et al. on Dec. 18, 2012 entitled "Network stimulation engine" that describes methods, devices, and systems for simulating a large, realistic computer network. Virtual actors statistically emulate the behaviors of humans using networked devices or responses and automatic functions of networked equipment, and their stochastic actions are queued in buffer pools by a behavioral engine. An abstract machine engine creates the minimal interfaces needed for each actor, and the interfaces then communicate persistently over a network with each other and real and virtual network resources to form realistic network traffic. The network can respond to outside stimuli, such as a network mapping application, by responding with false views of the network in order to spoof hackers, and the actors can respond by altering a software defined network upon which they operate.

U.S. Pat. No. 8,369,238 issued to Xu, et al. on Feb. 5, 2013 entitled "Method, network, and computer product for flow based quality of service" that describes a method, network, and computer program product for traffic flow quality of service. A quality of service priority table is received for services defined by a user at the network, and the quality of service priority table includes quality of service levels for the services. Traffic flows are determined to correspond to packets being communicated over the network for the user. The traffic flows are mapped to services. The traffic flows are mapped to the quality of service levels for the services. The quality of service levels are assigned to the traffic flows as assigned quality of service levels corresponding to the services. Each of the traffic flows is routed over the network according to its assigned quality of service levels, respectively U.S. Pat. No. 8,448,238 issued to Gupta, et al. on May 21, 2013 entitled "Network security as a service using virtual secure channels" that describes methods, devices, and systems to provide an end-to-end secure transaction over a software defined network (SDN). In one embodiment, a machine-implemented method comprises opening an in-band virtual secure channel (VSC) or an out-of-band VSC over the SDN; authenticating, through the control plane of a switch managing the SDN, a user of a resource over the in-band VSC or the out-of-band VSC; authorizing the user, through the control plane, access to the resource over the in-band VSC or the out-of-band VSC; and accounting for a transaction conducted by the user accessing the resource, through the control plane, over the in-band VSC or the out-of-band VSC. In another embodiment, a switch to manage the SDN and to implement the method described herein is disclosed.

US Patent Application 20140301192 by Young Lee et al. published on Oct. 9, 2014 entitled "Software Defined Networking (SDN) Controller Orchestration and Network Virtualization for Data Center Interconnection" that describes a data center interconnection (DCI) network having a data center controller (DCC) managing a plurality of data centers (DCs) interconnected by a provider network managed by a network provider controller (NPC). The provider network may be an OpenFlow™ based software defined networking (SDN) transport network. The DCC may initiate a virtual network service (VNS) negotiation with the NPC to connect the DCs and may specify a network abstraction granularity level. The NPC may respond by computing paths through the provider network accordingly and providing the DCC with one or more virtual networks (VNs). The DCC may compute virtual paths through the VNs and send virtual network element (VNE) connection setup commands to the DCC. The DCC may convert the VNE connection setup commands into network element (NE) commands to setup connections in NEs of the provider network. The DCC and the NPC may perform fault monitoring, detection, and recovery.

US Patent Application 20140146674 by Jiao Wang et al. published on May 29, 2014 entitled "Packet Prioritization in a Software-Defined Network Implementing OpenFlow™" that describes a software-defined networking (SDN) OpenFlow™ apparatus having a processor, and a memory system coupled to the processor and comprising a flow pipeline, and wherein the flow pipeline comprises a series of flow tables, wherein each of the flow tables comprises at least one match field, wherein the match fields correspond to a plurality of network services, wherein the match fields are ordered based on a prioritization of the network services, which of the match fields are shared among the network services, a shared dependency of the match fields, and processing speed, and wherein the prioritization is based on which network services are most important and which network services are most frequently used.

US Patent Application 20140112190 by Wu Chou et al. published on Apr. 24, 2014 entitled "System and Apparatus of Generalized Network Controller for a Software Defined Network (SDN)" that describes a generalized network controller in a software defined network (SDN), controlling a network with mixed switches based on different and even incompatible OpenFlow™ (OF) standard versions, comprising a first transceiver connected to a first OF switch comprising a first OF standard version configured to receive messages from the first OF switch and to transmit messages to the first OF switch; a second transceiver connected to a second OF switch comprising a second OF standard version configured to receive messages from the second OF switch and to transmit messages to the second OF switch, wherein the first OF standard version is different from the second OF standard version, and wherein the first OF standard version is incompatible with the second OF standard version; and a processor coupled to the first and second transceivers and configured to control the first and the second OF switches.

Various implementations are known in the art, but fail to address all of the problems solved by the invention described herein. Various embodiments of this invention are illustrated in the accompanying drawings and will be described in more detail herein below.

SUMMARY OF THE INVENTION

A method for optimizing delivery of digital information packets across a network of linked, packet switching nodes is disclosed.

In a preferred embodiment of the present invention, a suitable digital, electronic computer may be programmed to perform the function of receiving a business oriented request from a user and translating that request into a network technical requirement.

The business oriented request may, for instance, be a request for a type of operation to be carried out at, or over, a specified period of time between specified transmitting and receiving hardware. The request may, for instance, be a function such as, but not limited to, a backup service, a video streaming service, a video conferencing service, a big data analytics service or some combination thereof.

The computer may then be programmed to convert the request into network technical requirements that may specify needs such as, but not limited to, a specific network bandwidth, a minimized network cost, a minimized operator cost, a minimized total delay, an optimized bandwidth, an optimized reliability, a maximized end-to-end throughput, a guaranteed minimum average bandwidth, a maximum transmission delay or some combination thereof.

The computer may be programmed to, using knowledge such as, but not limited to, a pre-stored or real-time discovered topographical map of the network, to automatically determine a setting of one or more software addressable data-planes, i.e., packet forwarding devices in the network that may be implemented via the control plane in order to achieve the network technical requirements.

At an appropriate time, the computer may then configure some or all of the network remotely via one or more software addressable data planes located at nodes on the network. Therefore, the present invention succeeds in conferring the following, and others not mentioned, desirable and useful benefits and objectives.

It is an object of the present invention to provide a business driven method and system for achieving a required performance of service in a Software-Defined Networking (SDN) environment.

It is another object of the present invention to provide a method of automatically associating a business user identity with network flow characteristics and technical requirements of one or more specific services.

Yet another object of the present invention is to provide a system and method of automatically converting business requirements into the technical requirements for construction of the required network flow.

Still another object of the present invention is to automatically determine an optimum pathway for a user requested service utilizing a network while satisfying the resource constraints of the elements constituting the network.

DESCRIPTION OF THE PREFERRED EMBODIMENTS

The preferred embodiments of the present invention will now be described with reference to the drawings. Identical elements in the various figures are identified with the same reference numerals.

Reference will now be made in detail to embodiments of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 1:
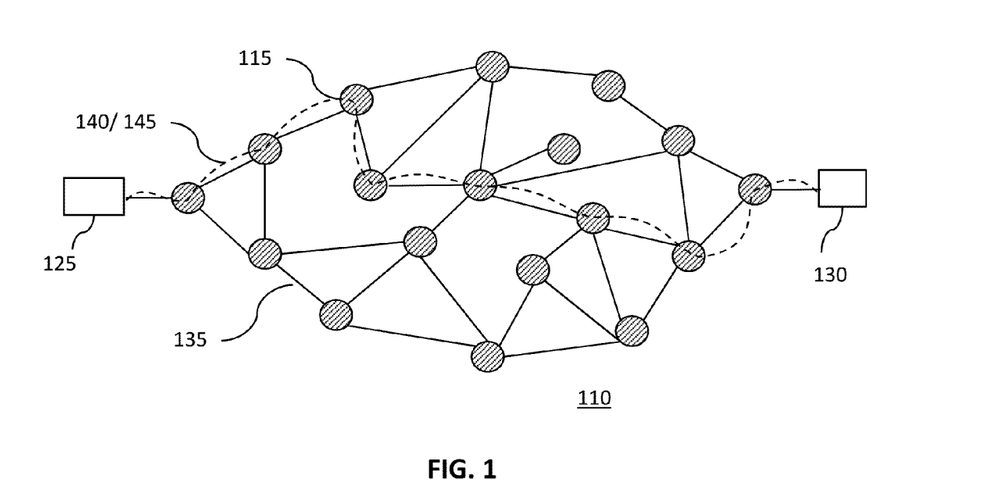
FIG. 1 shows a schematic diagram of a network of linked nodes.

FIG. 1 shows a schematic diagram of a network 110 of linked nodes 115. The network of FIG. 1 may be representative of a packet switching network such as, but not limited to, to the Internet, in which data is transmitted from a first, originating network connected device 125 to a second, destination network connected device 130 via a series of nodes 115. The network nodes 115 are typically geographically separated and may have data links 135 to an adjacent node that may be a communications channel such as, but not limited to, a copper wire, a fiber optic, a wireless signal or some combination thereof. The path 140 of a data packet 145 over the network may be determined by each node having a look up table that may be a topographical map, or some relevant abstraction thereof, of the network to which it is connected. Each data packet typically also contains a destination address and an origination address. Typically, a forwarding device at each node reads the destination address of the packet and may either query the controller or forward the packet as instructed by the rules on the data plane to another node. This will be done by each node until the packet will arrive to the destination device address.

A challenge for the operation of data communications networks of this design is to optimize delivery of digital information packets across the network of linked nodes. To do this, it may be necessary to centrally optimize the forwarding behavior of flows with respect to business and technical requirements.

Figure 2:
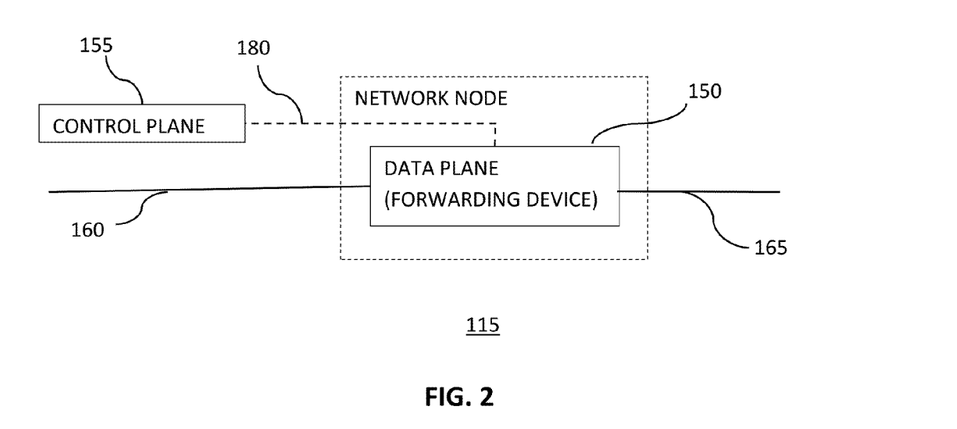
FIG. 2 shows a schematic diagram of components of a representative node.

FIG. 2 shows a schematic diagram of the components of one possible node 115. A network node 115 may, for instance, have a data plane 150. The data plane may be software settable via a link 180 to remote controller such as, but not limited to, a control plane 155.

An incoming data link 160 may connect the data plane 150, typically having one or more forwarding devices, to one or more other network nodes. Similarly an outgoing data link 165 may connect the data plane to one or more other network nodes.

Figure 3:
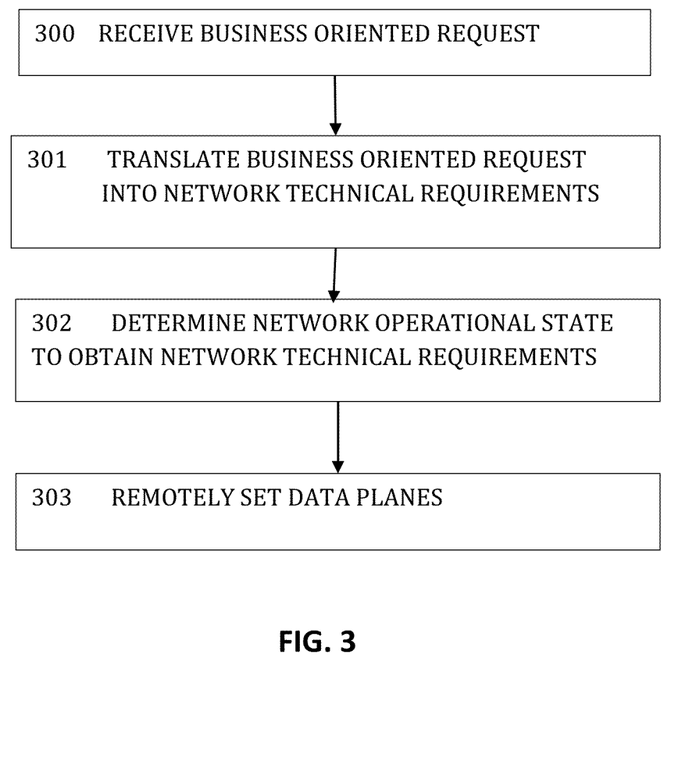
FIG. 3 shows a flow diagram of some of the steps of an embodiment of the present invention.

FIG. 3 shows a flow diagram of some of the steps of an embodiment of the present invention.

In step 300 RECEIVE BUSINESS ORIENTED REQUEST, a user may input a request for network use or access that may be framed as a business objective. The request may, for instance, be for a service such as, but not limited to, a backup service, a video streaming service, a video conferencing service, a big data analytics service or some combination thereof. The request may be for a specific date and time and may involve specific origination and destination hardware that may, for instance, be identified by device identifiers such as, but not limited to, MAC or an IP addresses, or some combination thereof.

In step 301 TRANSLATE BUSINESS ORIENTED REQUEST INTO NETWORK TECHNICAL REQUIREMENT, the request received in step 300 may be automatically translated into a set of network technical requirements by a suitably programmed digital data processor or computer. The network technical requirement may, for instance, be parameters such as, but not limited to, a specific network bandwidth, a minimized network cost, a minimized operator cost, a minimized total delay, an optimized bandwidth, an optimized reliability, a maximized end-to-end throughput, a guaranteed minimum average bandwidth, a maximum transmission unit (MTU) or some combination thereof.

In a preferred embodiment, the technical parameters may be arrived at using natural language processing methods such as, but not limited to, recognition of key words within the business specification, and then using predefined parameters for those recognized functions. For instance, a request for "video streaming" at a certain day and time from a particular device to a set of other devices may be automatically translated into a set of bandwidth requirements on that date or time over certain paths within the network.

As will be described in more detail below, the system may then use data, such as a topological map of the network linked nodes, to determine the feasibility of meeting the requested network technical requirements. The system may then provide feedback to the user suggesting possible alternate scenarios that may be within the network capability. These suggestions may, for instance, be expressed in business oriented language such as, but not limited to, suggestion of alternate dates, times, limits on the number or geographical location of recipients, or limits on the video quality or some combination thereof.

In step 302 DETERMINE NETWORK OPERATIONAL STATE TO OBTAIN NETWORK TECHNICAL REQUIREMENTS, having determined the feasible technical requirements that satisfy the user's business objective, these requirements may then be translated into specific settings for specific nodes within the network. This may, for instance, require identifying the nodes that are software addressable and then determining the commands necessary to instruct them to perform as required when required. In practice this may require translating technical requirements into product specific commands such as, but not limited to, OpenFlow™ protocol.

In 303 REMOTELY SET DATA PLANES the control computer may now, at the appropriate time, send the necessary commands to the network forwarding devices to achieve the network functionality required to satisfy the user's business objective. These commands may, for instance, inform or set up the switch to provide packet forwarding according to criteria that may provide the necessary network functionality. These optimal packet forwarding instructions may include rules or heuristics such as, but not limited to, selecting a path that is one of a shortest path end-to-end, a minimum hop count, a minimum path cost, a minimum geographic path, use of nodes with the maximum number of neighbors, or some combination thereof.

Figure 4:
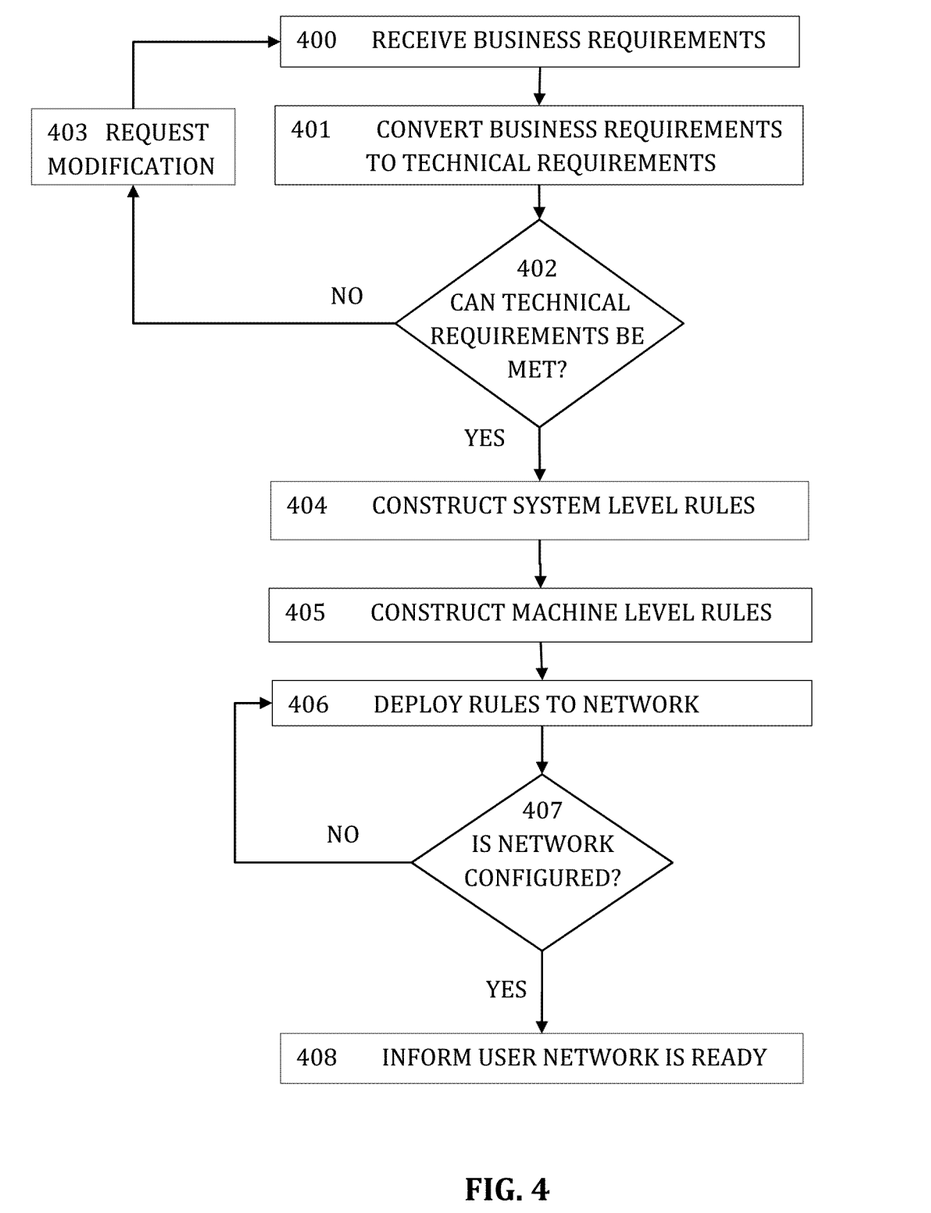
FIG. 4 shows a flow diagram of some of the steps of a further embodiment of the present invention.

FIG. 4 shows a flow diagram of some of the steps of a further embodiment of the present invention.

In step 400 RECEIVE BUSINESS REQUIREMENTS, a suitably programmed digital processor or computer may receive, via a suitably implemented graphical user interface, a business requirement pertaining to future data communication across a network. The requests may, for instance, be formulated as a natural language request and may require little or no technical knowledge of the network or of the networks capabilities. Typically such requests are for higher quality services than may normally be available over the network.

In step 401 CONVERT BUSINESS REQUIREMENTS TO TECHNICAL REQUIREMENTS, the suitably programmed digital processor or computer may parse the natural language requests to identify key words or phrases that may be converted into network technical requirements.

In step 402 CAN TECHNICAL REQUIREMENTS BE MET?, the suitably programmed digital processor or computer may access a digital representation of the network and may, for instance, run simulations of the identified technical requirements to see if they can be met by the network as currently configured or as it would be configured at the time the request needs to be fulfilled. If the computer program determines that the technical requirements cannot be fulfilled, then in step 403 REQUEST MODIFICATION the program may inform the user of this inability to perform the request as input and interpreted. This request for modification may be relayed to the user via the user interface that may be a graphical user interface. The request for modification may be accompanied by one or more suggestions as to what an acceptable request may be. These suggestions in the requests for modification are preferably expressed in general, non-technical terminology but may require some degree of technical specificity. For instance the suggestion may be "move the data transfer to between 1 am and 2 am in the morning" or it may be "reduce the video requirement to less than high definition" or it may be "reduce the video requirement to a bandwidth of less than 6 Mbps".

If the program determines that the technical requirements can be met by the network if suitably configured, then the program may move to step 404 CONSTRUCT SYSTEM LEVEL RULES. These system rules may, for instance, be general rules about system wide forwarding algorithms to be used.

The program may then proceed to step 405 CONSTRUCT MACHINE LEVEL RULES. This is the level at which the system rules may be converted into machine instructions to be delivered to the programmable forwarding devices, e.g., switch, and may be in a language such as, but not limited to, OpenFlow™ protocol instruction language.

In 406 DEPLOY RULES TO NETWORK, the machine level instructions may be propagated out to the specific data planes, i.e., forwarding devices, to implement the enhanced service required by the business user.

In step 407 IS NETWORK CONFIGURED? the system may perform one or more tests to ensure that the network is configured correctly and providing the required confirmation from the network controller. If the network is not performing the program may return to step 406 to ensure that the machine level rules have been deployed correctly and to rectify any possible errors or miss-communications.

If the network is deemed, in step 407, to be correctly configured and working to the required specifications, the program may then proceed to step 408 INFORM USER NETWORK IS READY and inform the user, or the user hardware, that the system is now ready and the required data transfer may now begin.

Figure 5:
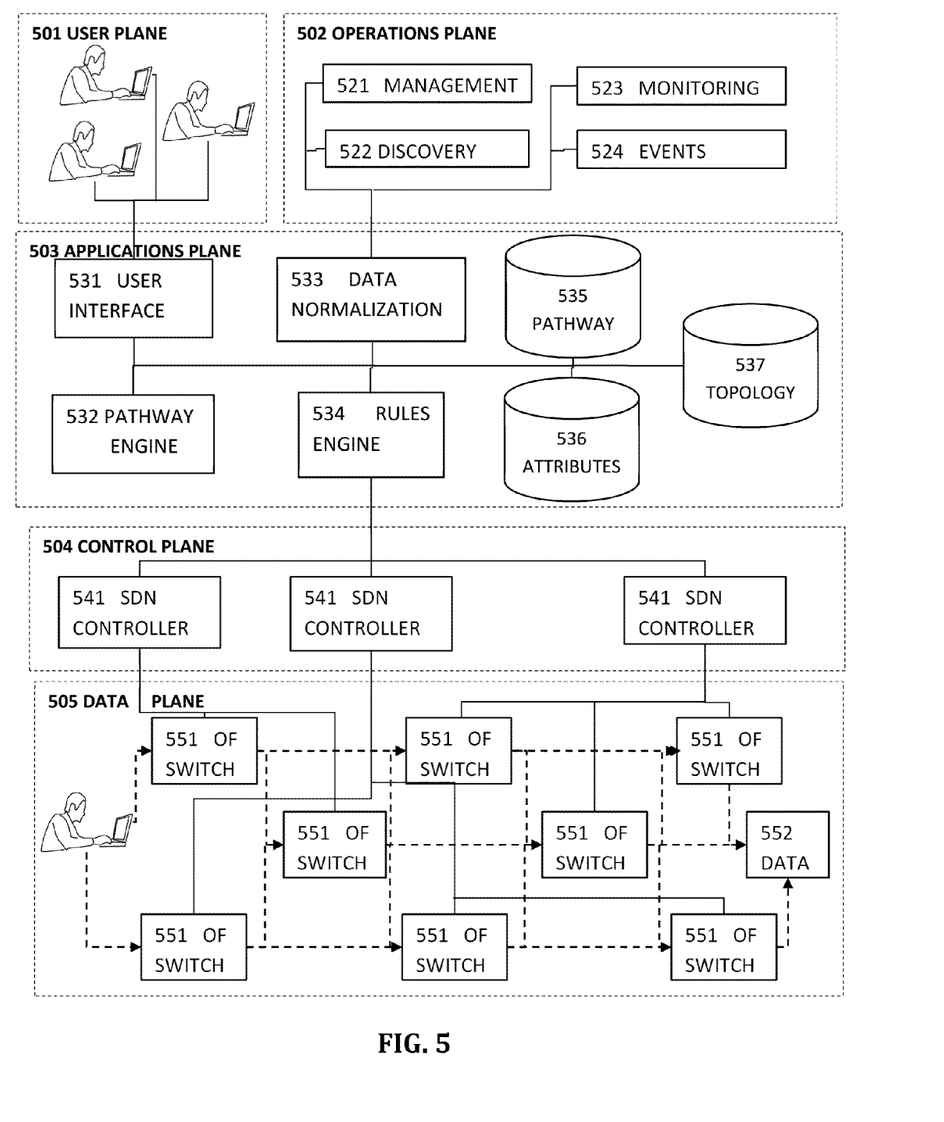
FIG. 5 shows a schematic diagram of one embodiment of the present invention.

FIG. 5 shows a schematic diagram of one embodiment of the present invention. In depicting this implementation, the system may be divided into a number of operational planes. These planes may include the user plane 501, the operations plane 502, the applications plane 503, the control plane 504 and the data plane 505.

The user plane 501 may be an API or a GUI that allows one or more business users to connect to the system. The users may, for instance, be identified by the hardware they are using by identifiers such as, but not limited to, the MAC or IP address of a computer. The identities may be applied to single users or to groups of users.

Other methods of determining the pathway input or access to the user plane may include parameters such as, but not limited to, a userID, a password, a MAC address, a device type, and organization name or ID, a group, sub-group or group profile, an application being used, a version of an application being used, a date, a time, a length of use, and an expiration date and/or time, or some combination thereof.

The user plane 501 typically interfaces with the applications plane 503 via a user interface 531. The user interface 531 may, for instance, be a graphical user interface and be functionally connected to a pathway engine 532. The pathway engine 532 may in turn be functionally connected to other software modules in the applications plane 503 such as the data normalization module 533, the rules engines module 534 and data bases such as a pathway database 534, a topology database 537 and an attributes database 536.

The topology database 537 may, for instance, store one or more maps of the network that may include data such as, but not limited to, a map of the nodes of a network and their connectivity to one another, a map of the physical hardware located at the nodes of the network, a map of the interconnections between the network hardware, a map of the geographical location of the network hardware components and a map of the software available on the hardware components or some combination thereof. The hardware components may, for instance, be devices such as, but not limited to, routers, bridges, gateways, firewalls, switches or some combination thereof.

In addition the topology database may be a store of operational capabilities of the network components such as but not limited to, the bandwidth capabilities, the current level of usage and the availability, or some combination thereof, of some or all of the hardware components of the network.

The attributes database 536 may store some or all the pre-defined attributes for the enterprise application which may be used within the enterprise and their respective requirements from the network. This database may allow the enterprise administrators to define new applications and/or to change any Application specific attributes. Other application attributes that may be stored may include data regarding the availability or the quality of functionality on network components such as, but not limited to, an application name, an application version, a sub-function, a module, a port, a bandwidth, a latency, a jitter, a quality or some combination thereof.

The pathway database 535 may, for instance, contain known pathways between two or more elements of the network that may satisfy some requirement or metric such as, but not limited to, a minimum number of hops between nodes, a minimum transit time, a minimum cost, a maximum bandwidth, or some combination thereof. These metrics may be, or have been, determined by well-known algorithms such as, but not limited to, the Routing Information Protocol (RIP), the Open-Shortest-Path-First Protocol (OSPF) or some distance vector algorithm such as, but not limited to, the Bellman-Ford algorithm, or some combination thereof.

A user may, for instance, interact with the pathway engine 532 via the user interface 531 by sending a request that is framed in a business oriented fashion. An example of such a request may be "I want to send a video to user group x in 5 minutes time". Using methods such as, but not limited to, keyword identification, data from one or more of the databases and further questions to the user, or some combination thereof, the pathway engine 532 may arrive at a technical specification of the request that may, for example take the form of "a link between a user in group x and application service y and z having a minimum bandwidth of n Kbps, a maximum latency of p milliseconds and a maximum packet size of at least m bytes is required beginning at time t".

Other methods that may be used in translating a business oriented request into technical requests may, for instance, include databases having examples of previous business requests and the corresponding technical requests that a skilled, human operator arrived at. Such databases may need to be large to be effective and may need as many as one million or more such matched pairs of business oriented requests and the corresponding technical requests that resulted from them.

The pathway engine 532 may then interact with the pathway database 535, the attributes database 536 and the topology database 537 to determine if the technical request may be met. Further interaction with the applications plane 503 and the databases may then arrive at a solution that comes closest to satisfying the user's business requirements. This solution may then be delivered to the rules engines module 534 where it may be converted into instructions that may be used by one or more Software-Defined Networking (SDN) controllers 541 located on the network in the control plane 504.

The SDN controllers 541 may then convert these rules into machine executable code that may be delivered to one or more programmable switches such as, but not limited to, switches that may operate under the OpenFlow™ protocol interface. Other switches that are not OpenFlow™ enabled may be able to be operated by using other interfaces such as, but not limited to, BGP and/or MPLS-TP, allowing them all to be managed from a single, remote source using a single, protocol.

These OpenFlow™ (OF) enabled switches 551 may be located at network nodes in the data plane 505 as an integral part of the communications network. By supplying them with the appropriate instructions, the OpenFlow™ (OF) enabled switches 551 may implement the technical requirements that may place the network, or some subset thereof, in a state to satisfy the user's business requirements.

Communications networks are typically dynamic systems that may change on a second by second basis. The operations plane 502 may allow one or more network managers to keep the system in an operational state, preferably an optimal operation state. The operations plane 502 may include a variety of software modules such as, but not limited to, a management module 521, a discovery module 522, a monitoring module 523, and an events module 524.

The management module 521 may, for instance, allow a manager to interact with the system via an interface that may be a graphical user interface. The management module 521 may allow the overall control of the communications network, or part thereof. The management module 521 may, for instance, allow a manager to initiate and set the parameters of the other operations plane modules.

The monitoring module 523 may, for instance, be set to monitor the current status of known network nodes as may be characterized in one or more of the maps in the topology database 537. The results of this monitoring, which may include data such as, but not limited to, current traffic loads, current transit times, current bandwidth or some combination thereof, may be sent to the applications plane 503 via the data normalization module 533. The data normalization module 533 may ensure that the data obtained by the monitoring module 523 from differing parts of the network are all converted into compatible units before being sent to the attributes database 536. For instance, all bandwidths may be converted to a common unit such as, but not limited to, kilobits per second (Kbps). Similarly, latency may all be converted to another common standard such as, but not limited to, milliseconds (ms). Other data that may be normalized may be data such as, but not limited to, device IDs, device types, IP addresses, port numbers, VLAN IDs, utilization, capacity, availability and layer 2 (L2) connectivity or some combination thereof.

The discovery module 522 may, for instance, be set to interrogate various network elements to obtain data about additions or deletions from the network, or the network elements. This data may then be supplied to the topology database 537 in the applications plane 503 via the data normalization module 533. The data normalization module 533 may ensure that all hardware elements are described by a common standard. A particular piece of hardware that may be referenced by different names in different parts of the network may be designated to a common name. As a hypothetical example, a switch that may be referred to as a generic super switch from Vendor A in one part, and another switch in another part may be the same switch series and the data normalization module 533 may ensure that they are both referenced using the same tag. This may, for instance, simplify storage of performance characteristics as no redundant specification data sheets may need to be stored in the topology database 537.

The events module 524 may, for instance, be taking notes of events on the network such as, but not limited to, planned user pathway requirements in anticipation of known upcoming requests for network settings on the network, or part of the network, such as, but not limited to, the need to transfer a specific large volume of data from one network node to another to facilitate a function such as, but not limited to, a backup of a computer system, or a transfer of video, or some combination thereof. Data concerning these anticipated or ongoing events may be supplied to the topology database 537 on the applications plane 503 via the data normalization module 533.

Figure 6:
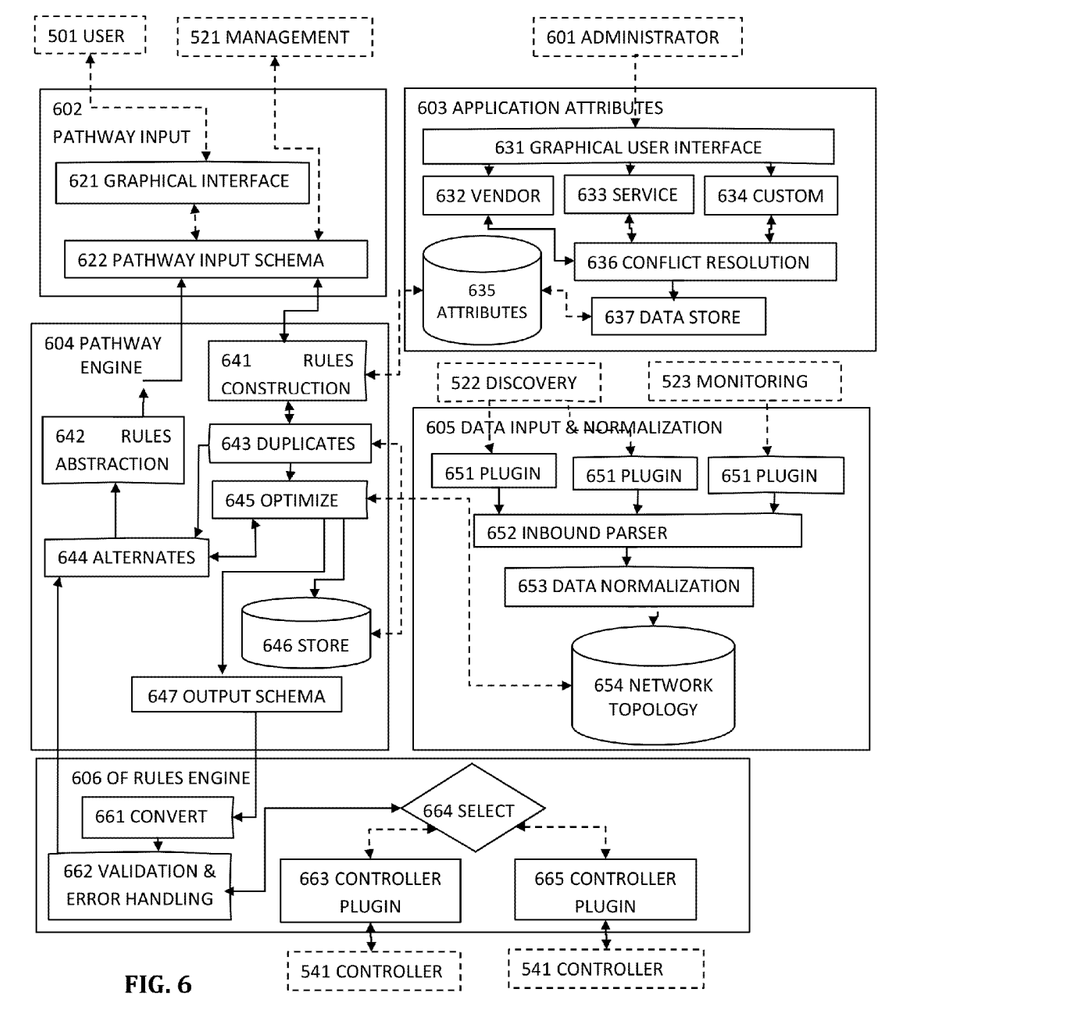
FIG. 6 shows a schematic diagram of a further embodiment of the present invention.

FIG. 6 shows a schematic diagram of a further embodiment of the present invention.

In FIG. 6, the control system has been grouped together by functionality. The functions represented include the pathway input 602, the application attributes modules 603, the pathway engine 604, the data input and normalization 605 and the Open-Flow™ (OF) rules engine 606.

Both the user 501 and the management 521 may interact with the pathway input 602. The user may interact via a graphical interface 621. The graphical interface 621 may automatically translate the user's business request into network technical requirements before sending it on to the pathway schema module 622. The management 521 may be more technically literate and may, therefore, interact directly with the pathway schema module 622.

The pathway schema module 622 may then interact with the pathway engine 604. This interaction may initially be a two way interaction with the rules construction module 641.

The rules construction module 641 may interact with the application attributes database 635 in order to obtain information on the current capability of the network and to inform the network of upcoming requirements that may impact other users.

The rules construction module 641 may also interact with a duplicates module 643 that may weed out rules that essentially duplicate each other so as to attempt to minimize the number of rules that may need to be deployed and implemented.

The system may then move on to the optimization module 645. The optimization module 645 may interact with the topology database 654 to determine the best possible way to implement the rules given the current configuration of the network. In doing so it may then interact with the alternates module 644 to arrive at possible alternate rules that may result in meeting the business requirements in similar, the same, or better ways. The rules abstraction module 642 may then convert the rules into a form that may be sent to the pathway schema module 622. The pathway schema module 622 may also provide a non-technical user method for capturing the requirements; alternatively a management function may interact with module 622 for automation.

By this interaction, an optimized set of rules may be arrived at and a copy of them placed in a pathway store database 646.

These rules may, for instance, be instructions regarding when, or under what circumstances, actions may be taken regarding a packet such as, but not limited to, when it may be forwarded to a particular port or ports, or to a controller, or dropped, kept, modified, have a VLAN ID or VLAN priority removed, or modified, have a source MAC address or a destination MAC address modified, or some combination thereof.

The optimized set of rules may also be sent to an output schema module 647 where they may be translated into a format that the OpenFlow™ (OF) rules engine 606 may deal with. In the conversion module 661 the rules may be converted into machine level code suitable for use by programmable data switches. A validation and error handling module 662 may then check the machine level code to make sure that it is within the capabilities of the switches and that there are no errors in the instructions. If there are errors or attempts to configure the switches beyond their capabilities, the alternates module 644 on the pathway engine 604 may be informed and a further round of interaction may occur that may arrive at a set of rules that the validation and error handling module 662 may find acceptable. The instructions may then be transferred to a selector module 664 that may decide which controller plugin 663 to address it to so that the code is sent to the appropriate Software-Defined Networking (SDN) controllers 541 on the appropriate network node.

FIG. 6 also shows how an administrator 601 may interact with the application attributes modules 603. Interacting via a graphical user interface 631, the administrator 601 may, for instance, be able to set network attributes that may be vendor specific attributes 632, service provider specific attributes 633 or customer specific attributes 634. The settings of these attributes may then be examined and any potential conflicts resolved by a conflict resolution module 636. A data storage module 637 may then store the sets of resolved attributes on the attributes database 635.

FIG. 6 also shows how data from the discovery module 522 and the monitoring module 523 may be input into the data input and normalization 605 via one or more plugin modules 651. From the plugin modules 651, the incoming data may pass through and inbound parser module 652 before going on to a data normalization module 653 that may convert all the data to a common structure of units. The normalized data may then be added to, or modified in the network topology database 654.

Figure 7:
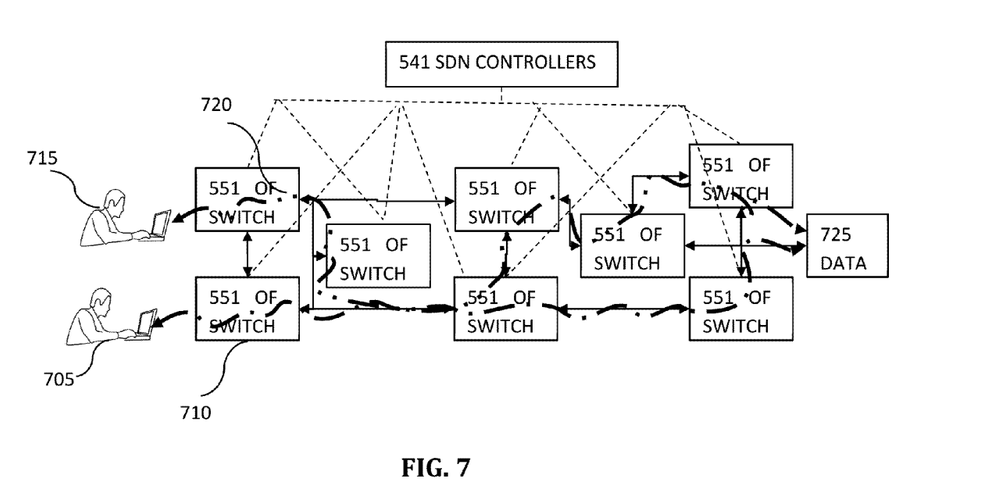
FIG. 7 shows a schematic diagram of a network of linked node functioning in one embodiment of the present invention.

FIG. 7 shows a schematic diagram of a network of linked node functioning in one embodiment of the present invention.

The switches, which may be OF enabled switches 551, of the communications network are controlled by one or more SDN controllers 541. The switches are configured such that data sent to and from business user 705 to a data store 725 may follow a prioritized path 710. Data from non-business user 715 follows a non-optimal path 720. This may be so as to allow business user's 705 data packets to be sent to the optimum next node.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A method for optimizing delivery of digital information packets across a network, comprising:
    said network comprising two or more geographically separated nodes each having one or more programmable software addressable digital packet switching switches or Openflow enabled network switches;
    providing a digital, electronic computer functionally connected to said network and programmed to perform the functions of:
        automatically translating a business oriented request, framed as a business objective and received from a business user, into a network technical requirement expressed as one or more technical parameters required to meet packet flow from a particular source node to a particular, geographically separated, destination node of the network;
        using a topographical map of said network of linked nodes and a database of the current attributes of the components of the network, to automatically determine a feasibility of having the network meet the required technical parameters, said feasibility being determined by running one or more simulations on a digital representation of the network; and,
        if the technical parameters are deemed not feasible, supplying a suggested alternative action, framed as one or more business objectives that are feasible; or
        if the technical parameters are deemed feasible, further determining a setting of one or more of said software addressable digital packet switching switches or Openflow enabled network switches, of said network of linked nodes to achieve said technical parameters to meet said network technical requirement; and
        geographically remotely setting one or more of said software addressable digital packet switching switches or Openflow enabled network switches, so as to achieve the technical parameters required by said network technical requirement.

2. The method of claim 1 wherein said business oriented request comprises a natural language request, and wherein translating said business oriented request into a network technical requirement comprises recognizing one or more key words.

3. The method of claim 1 wherein said business oriented request comprises one of a backup service, a video streaming service, a video conferencing service, a big data analytics service or some combination thereof.

4. The method of claim 3 wherein said business oriented request comprises a video distribution service.

5. The method of claim 1 wherein said network technical requirement comprises providing one of a specific network bandwidth, a minimized network cost, a minimized operator cost, a minimized total delay, an optimized bandwidth, an optimized reliability, a maximized end-to-end throughput, a guaranteed minimum average bandwidth, a maximum transmission unit (MTU) or some combination thereof.

6. The method of claim 5 wherein said network technical requirement comprises providing a specific network bandwidth.

7. The method of claim 1 further comprising:
    identifying said business user by a identifier associated from a networked user device; and
    translating said network technical requirements into optimal packet forwarding requirements for one or more packets originating from said user device.

8. The method of claim 7 wherein said optimal packet forwarding requirements comprise one of a shortest path end-to-end, a minimum hop count, a minimum path cost, a minimum geographic path, use of nodes with the maximum number of neighbors, or some combination thereof.

9. The method of claim 7 wherein said business user is identified by a plurality of identifiers each associated with one or more networked user devices.

10. The method of claim 7 wherein said optimal packet forwarding requirements further comprise conflict resolution alternatives.

11. The method of claim 10 wherein said conflict resolution alternatives comprise selecting, in the event of a conflict, one of a next best path after the shortest paths, the next best minimum hop count, the next best minimum path length, the next best minimum geographic path, the use of the node with the next best maximum number of neighbors or some combination thereof.

12. The method of claim 1 wherein said topographical map comprises one or more performance data sets acquired from one or more nodes in said linked network of nodes.

13. The method of claim 12 wherein said performance data sets are normalized before incorporation into said topographical map.

* * * * *